United States Patent [19]

Nosker

[11] 4,113,897

[45] Sep. 12, 1978

[54] SMOOTH GROOVE FORMATION METHOD EMPLOYING SPIN COATING OF NEGATIVE REPLICA OF INSCRIBED DISC

[75] Inventor: Richard William Nosker, Princeton, N.J.

[73] Assignee: RCA Corporation, New York, N.Y.

[21] Appl. No.: 327,804

[22] Filed: Jan. 29, 1973

[51] Int. Cl.² .................... B32B 35/00; B05D 3/12
[52] U.S. Cl. .................... 427/140; 264/107; 427/240; 427/275; 427/290
[58] Field of Search .......... 117/8, 101, 2 R, 5.1, 117/4; 264/107; 427/275, 290, 140, 240

[56] References Cited

U.S. PATENT DOCUMENTS

| | | | |
|---|---|---|---|
| 1,078,265 | 11/1913 | Edison | 117/101 |
| 2,407,179 | 9/1946 | Savage | 117/101 |
| 2,670,308 | 2/1954 | Groff et al. | 274/41 R |
| 3,198,657 | 8/1965 | Kimball et al. | 117/101 |
| 3,431,333 | 3/1969 | Fiornascente | 264/107 |
| 3,652,314 | 3/1972 | Castner | 117/2 X |
| 3,687,664 | 8/1972 | Broadbent | 117/8 X |
| 3,747,390 | 7/1973 | Knothe et al. | 264/107 |
| 3,767,445 | 10/1973 | Chandross et al. | 117/8 |
| 3,779,806 | 12/1973 | Gipstein et al. | 117/8 |
| 3,795,534 | 3/1974 | Mehalso et al. | 117/101 |

FOREIGN PATENT DOCUMENTS 924,781  5/1936  United Kingdom.

*Primary Examiner*—Ronald H. Smith
*Assistant Examiner*—Stuart D. Frenkel
*Attorney, Agent, or Firm*—Eugene M. Whitacre; William H. Meagher

[57] ABSTRACT

A method of forming a recording disc having a smooth groove suitable for recording video information from a disc having irregularities along the peaks between adjacent groove convolutions by replicating the grooved disc to produce a negative reproduction of the groove and applying an excess of deformable or removable material such as electron beam sensitive material to the surface of the replicated disc while rotating the disc rapidly only long enough to drive off the excess material and allowing the remaining material to dry, partially filling the groove and providing a continuous coating over the wall and valley portions thereof.

7 Claims, No Drawings

SMOOTH GROOVE FORMATION METHOD EMPLOYING SPIN COATING OF NEGATIVE REPLICA OF INSCRIBED DISC

BACKGROUND OF THE INVENTION

This invention relates to the manufacture of discs suitable for the recording and reproduction of information including video information. More particularly, this invention relates to a method of preparing smooth grooves on the surface of a disc prior to recording such information thereon.

A system for recording and playback of video information has been described in a copending application Ser. No. 126,772, of Jon K. Clemens, filed Mar. 22, 1971, now U.S. Pat. No. 3,842,194, issued Oct. 15, 1974. According to this system, a lacquered surface is deposited on a thick aluminum disc and a continuous spiral groove is cut into the lacquered surface. A first nickel replica is then made of the grooved lacquer surface by depositing nickel over such surface and thereafter separating the nickel coating from the lacquer. This first nickel replica is a negative reproduction of the original grooved lacquer. A second nickel replica is made of the first replica to form a metal disc that is a positive reproduction of the original grooved lacquer. A coating of electron beam sensitive material, for example, Shipley No. 1350 Photoresist manufactured by Shipley Company of Newton, Massachusetts, is thereafter applied to the second nickel replica by a process such as, for example, the one described in a copending application Ser. No. 245,657 in the names of Robert Michael Mehalso and David Isaac Harris entitled, "IMPROVEMENT IN THE MANUFACTURE OF VIDEO DISC" and assigned to RCA Corporation, now U.S. Pat. No. 3,795,534, issued Mar. 5, 1974.

The photoresist-coated replica is then exposed to a video-signal-modulated beam of a scanning electron microscope, which provides exposure of the photoresist in the groove of the disc in correspondence to the video signal information. The photoresist is then developed and the exposed portions of photoresist are removed to form a topography in the groove corresponding to the video signal information. A nickel replication is made of the resultant disc, and this replication is utilized to stamp or emboss vinyl records by techniques known in the audio recording art. The vinyl replica is then metalized to make the surface conducting, and the metalization is thereafter coated with a dielectric. In playing back the recorded information, a stylus is caused to ride in the dielectric coated groove. This stylus, along with the metalization and dielectric, acts as a capacitor. Capacitance variations in the groove, which correspond to the recorded video information, are then detected electronically to recover the video information.

In order to produce images in the playback operation which are relatively free of background noise, it is necessary to eliminate the transfer to the final vinyl record of irregularities formed in the original grooved lacquer.

In practice, the cutting of a smooth groove in the original lacquer, free of irregularities, has been a severe problem. The spiral groove is cut by a sharp cutting stylus of a predetermined shape (such as triangular cross-section) into the lacquer layer on the metal disc. As cutting proceeds, irregularities form in the peak regions between adjacent convolutions of the groove, the peak regions being known in the audio recording art as land regions. These irregularities, unless masked or removed, are replicated in the vinyl record. Subsequently, when the vinyl record is played back, the embossed irregularities in the peak regions of the groove perturb the playback stylus and cause erroneous signal (noise) pickup.

SUMMARY OF THE INVENTION

A method of preparing smooth grooves in an information storing disc comprises a first step of forming a groove in a first disc. This first grooved disc is then replicated to form a second disc having grooves of opposite contour as compared to the grooves in the first disc, thereby placing any irregularities formed in the peak regions between adjacent groove convolutions of the first disc in the valley of the groove formed in the second disc. Thereafter, an excess of fluid material having a predetermined viscosity is applied to the groove of the second disc while the second disc is rotated in a plane about its axis at a predetermined rate. This rotation continues for a sufficient time to drive off fluid material in excess of that required to provide a continuous coat over the valley, wall and peak regions of the groove. This rotation process causes the fluid material to partially fill the valley portion of the groove with sufficient material to smooth over the irregularities in the bottom of the groove while still coating the entire disc, thereby forming a smooth, grooved disc when dried which has a surface suitable for topographical recording of information therein.

DETAILED DESCRIPTION OF THE INVENTION

In practicing the present invention, grooved nickel recording masters may be prepared in a manner similar to that described in the application of Clemens referred to hereinbefore.

For example, a base disc of about 1/2 inch thick aluminum blank, 14 inches in diameter, is machined flat to a tolerance of about 0.0002 inch. An acetone solvent is then used to clean the surface of the aluminum blank and care is taken to avoid allowing any dust particles to land on the cleaned surface. The disc is then placed on a turntable and rotated at a speed of about 5 to 7 rpm. Approximately 150 milliliters of thick lacquer is then poured over the rotating disc. This rotation process allows the lacquer to coat the aluminum blank to a thickness, when dried, of about 0.005 inch. After application of the lacquer has formed a uniform coating on the aluminum disc, the turntable is stopped and an enclosure placed over the disc, partially sealing the lacquer coating from the air to prevent the lacquer from drying rapidly and producing a rough finished surface.

After about 8 hours, the coated disc is removed from its enclosure and allowed to continue drying in air for about 5 days. After the 5-day drying period, the lacquer-coated disc is placed in a jig bore lathe and the lacquer surface machined flat to a tolerance of about 0.0002 inch. Thereafter, a spiral groove having valley, wall and peak regions is cut into the lacquered surface. This groove is cut with a record-cutting lathe having a diamond stylus that is heated to a point just below the melting temperature of the lacquer. The groove cutting is accomplished in several steps and typically requires two or three passes over the same groove area with the heated diamond stylus in order to obtain a satisfactorily smooth groove. The stylus has two cutting faces arranged to form two walls in the groove which are inclined at substantially equal, but opposite, angles with respect to a line normal to the lacquer surface.

Despite the care taken to cut the spiral groove, irregularities form at the peak regions of the groove. These irregularities manifest themselves in the replicated copies of the grooved lacquer and unless these irregularities are removed, or their effect lessened, the irregularities will cause signal errors in the playback video disc.

The grooved lacquer with its irregularities at or near the groove peaks may be replicated in nickel by known processes such as the following. The grooved lacquer disc is first dipped in a colloidal solution containing stannous and stannic ions. This allows the lacquered surface to adsorb the ions and thereby sensitize the surface for subsequent nickel adhesion. The sensitized lacquer disc is thereafter dipped into a second solution of palladium chloride. The palladium chloride solution interchanges with the stannous ions, allowing pure palladium to be adsorbed on the surface of the disc. This coating of palladium on the disc surface provides the necessary catalytic action for electroless depositing of nickel on the disc. Hence, when the palladium coated disc is immersed in a solution such as nickel chloride or nickel sulfate, pure nickel is taken from the ionized solution and deposited on the disc. In this nickel deposition process, 1 mil (0.001 inch) of bright nickel is deposited on the disc and thereafter nine mils of sulfamate nickel is deposited. A more detailed description of such an electroless nickel deposition process may be found in U.S. Pat. No. 3,666,527, dated May 30, 1972, in the name of Nathan Feldstein et al. and assigned to RCA Corporation.

A second aluminum disc is thereafter bonded to the nickel surface by, for example, an epoxy resin. As the bonding material dries, the two aluminum discs are pulled apart separating the nickel layer from the grooved lacquer. The separated nickel layer is a negative replication of the grooved lacquer, having the rough edges that appeared at the groove peaks in the lacquer at the bottom or valley of the replicated groove. These irregularities may be covered over by application of a viscous fluid material which, when dried, conforms generally to the groove shape, partially filling the groove and smoothing over or masking the irregularities at the bottom of the groove. In practice, formable material such as electron beam sensitive material suitable for impressing video signal information, for example, by exposure to a signal-modulated scanning electron microscope beam, is used for smoothing over the grooves in the video disc. Other formable material, such as light sensitive material, may be used for masking groove irregularities particularly when signal information is to be impressed by a modulated light source (for example, a laser). The viscosity of the electron beam sensitive material utilized for filling in the groove typically is of the order of 4.5 centipoise. However, other viscosities may also be employed, depending upon the method of application.

Thus, in accordance with the present invention, the disc having a negative replica of the grooves of the lacquer is coated with formable material such as electron beam sensitive material in a manner similar to that employed previously in connection with positive replications. That is, the disc to be coated with formable material is placed on a turntable and rotated in a plane about a central axis at a speed in the range of about 100 to 2,000 rpm, but typically at about 450 rpm. An excessive quantity of fluid, electron beam sensitive material is then uniformly sprayed onto the rotating disc and the excess driven off by the centrifugal force of rotation. Different viscosities and rotational speeds may be employed, and suitable combinations may be determined experimentally. If materials of higher viscosity than the example mentioned are employed, higher rotational speeds also may be employed. Alternatively, lower viscosities and lower speeds may be employed. After about one minute of rotation at the 450 rpm speed, the disc is then slowed to a speed in the range of about 2 to 10 rpm until the electron beam sensitive material dries. Alternatively, spin drying at the higher rate (about 450 rpm) may be employed for discs having about 4,000 grooves per inch. Under typical ambient room conditions of 70° F. and 40 percent humidity, a drying time of 5 days may be expected.

The formable coating applied to the grooved lacquer replica covers the irregularities formed in the valley region of the spiral groove, providing thereby a smooth grooved disc free from the replicated irregularities. Video information subsequently may be topographically formed in this smooth groove, for example, by exposure to the scanning electron microscope beam, and a metal disc replica made thereof. This metal replica is referred to as a stamper and is used to stamp or emboss vinyl records with the video information.

The metal stamper is free from the undesired irregularities covered over by the formable coating in the subsequent process and is therefore able to stamp or emboss vinyl records that are free from irregularities of the type formed in the peak regions between adjacent groove convolutions in the lacquer.

What is claimed is:

1. A method of preparing a smooth groove in a disc prior to the recording of information therein comprising the steps of:
    cutting a groove in a first disc, said groove having valley, wall and peak regions, said peak regions being undesirably subject to irregularities of contour as a consequence of said cutting;
    forming a negative replica of said first grooved disc, said negative replica comprising a second disc having a second groove with peak and valley regions corresponding respectively to valley and peak regions of the groove in said first disc;
    flowing fluid material of predetermined viscosity over the groove of said second disc while rotating said second disc in a plane about its axis at a predetermined rate, for a sufficient time to drive off the fluid material in excess of that required to provide a continuous coat over the valley, wall and peak regions of the groove of said second disc; and
    drying said material to form a continuous material coating over the groove area of said second disc partially filling the valley region of said groove to a depth suitable for topographically recording information therein, said coating having a smoothly curved surface contour in said valley region formed with substantial independence of variations in the contour of the valley region of the disc groove underlying said coating.

2. A method according to claim 1 wherein:
    said groove in said first disc is cut in such manner as to describe a spiral path along a surface of said first disc and
    said fluid material is flowed onto said second disc in sufficient quantity and of appropriate viscosity to form a continuous coat over valley, wall and peak regions of all convolutions of the spiral path described by the negative replica groove of said second disc.

3. A method of preparing a smooth-bottom spiral groove in a disc prior to the recording of information therein comprising the steps of:

cutting a spiral groove in a major surface of a first disc, said groove having valley, wall and peak regions, said peak regions being undesirably subject to irregularities of contour as a consequence of said cutting;

forming a negative replica of said first grooved disc, said negative replica comprising a second disc having in a major surface thereof a second spiral groove with peak and valley regions corresponding respectively to valley and peak regions of the groove cut in said first disc;

flowing fluid material of predetermined viscosity over the grooved surface of said second disc while rotating said second disc about the center of said major surface thereof so as to form a continuous coat of said material over valley, wall and peak regions of all convolutions of said second spiral groove and to drive off fluid material in excess of that required to provide said continuous coat; and drying said material to form a continuous coating over the grooved surface of said second disc; and wherein any irregularities of said peak portions of said groove cut in said first disc are replicated as irregularities of opposite contour in the valley regions of the groove formed in said second disc;

wherein the coating over the valley regions of said negative replica groove, as formed by said drying of said material, is sufficiently thick to mask said irregularities of opposite contour; and wherein said drying of said material, initiated during said rotation of said second disc, forms said valley region coating with a smoothly curved surface contour substantially independent of any variations of contour of the disc groove valley region underlying said coating.

4. A method according to claim 3 wherein:
said groove in said first disc is cut with opposed wall portions disposed at substantially equal but opposite angles with respect to a line normal to the ungrooved surface of said first disc.

5. A method according to claim 4 wherein:
the rotation of said second disc during the flowing of said fluid material occurs at a rate falling in a range from about 100 to 2,000 rpm.

6. A method according to claim 5 wherein:
said fluid material is a photoresist.

7. A method according to claim 4 wherein:
said drying of said fluid material forms a coating which is electron beam sensitive.

* * * * *